United States Patent [19]
Gleim et al.

[11] 3,723,560
[45] Mar. 27, 1973

[54] HYDROGENATION CATALYST AND PROCESS

[75] Inventors: William K. T. Gleim, Island Lake; Frederick C. Ramquist, Stickney, both of Ill.

[73] Assignee: Universal Oil Products Company, Des Plaines, Ill.

[22] Filed: Mar. 19, 1971

[21] Appl. No.: 126,262

[52] U.S. Cl..............260/677 H, 252/456, 252/461, 252/464
[51] Int. Cl............................C07c 11/02, B01j 11/06
[58] Field of Search...252/456, 461, 464; 260/677 H; 423/644

[56] References Cited
UNITED STATES PATENTS

| | | | |
|---|---|---|---|
| 2,727,024 | 12/1955 | Field et al. | 252/464 X |
| 2,930,767 | 3/1960 | Novak | 252/461 X |
| 3,076,858 | 2/1963 | Frevel et al. | 260/677 H |
| 3,207,703 | 9/1965 | Innes et al. | 252/464 X |

*Primary Examiner*—Daniel E. Wyman
*Assistant Examiner*—W. J. Shine
*Attorney*—James R. Hoatson, Jr. and Robert W. Erickson

[57] ABSTRACT

Group V-B metal hydrides as hydrogenation catalysts. Especially adaptable for the selective hydrogenation of di-olefins to mono-olefins--e.g., the hydrogenation of butadiene to 1- and 2-butene.

9 Claims, No Drawings

HYDROGENATION CATALYST AND PROCESS

APPLICABILITY OF INVENTION

The process encompassed by the present inventive concept involves the hydrogenation of olefinic hydrocarbons to produce more saturated products. In particular, our invention affords a novel catalyst which is especially adaptable for the selective hydrogenation of di-olefinic hydrocarbons to produce mono-olefinic hydrocarbons. Thus, while applicable for the saturation of acetylenic molecules—ethyl acetylene and dimethyl acetylene, for example — and aromatic hydrocarbons, —both mono- and polynuclear — our invention is specifically directed toward the selective hydrogenation of di-olefins. The selectivity resides in the fact that saturation is only partial, thereby resulting in mono-olefin production, as distinguished from total saturation, in which case the product is rich in paraffinic hydrocarbons. Exemplary of such selective hydrogenation is the conversion of 1,3-butadiene to 1-butene and 2-butene, and isoprene to methylbutenes. While the following discussion will be directed to the selective hydrogenation of butadiene, it is not intended that our inventive concept be limited to a particular unsaturated charge stock and/or the product to be derived therefrom. Thus, it is further intended to include the partial saturation of polynuclear aromatic hydrocarbons whereby the same become more susceptible to cracking to produce alkyl-substituted mononuclear aromatics.

Acknowledgement must be made of the fact that butadiene is itself a valuable product having a multitude of uses including styrene-butadiene rubber, latex-base paints, resins, etc. However, there are instances where butadiene, through its presence, constitutes a contaminating influence, or where the desired end product causes the value of butadiene to become secondary with respect to the value of partially saturated products, 1-butene and 2-butene. For example, the current stress and concern regarding clear gasoline production, in order to further inhibit severe pollution of the atmosphere, has resulted in an increased demand for motor fuel of the alkylate and polymer variety. In turn, this has brought about a steadily increasing demand for 1-butene and 2-butene, both of which are utilized in voluminous quantities as the charge stock for alkylation and polymerization processes. Whether the butadiene exists as a contaminating influence in the charge stock to an alkylation or polymerization process, due to its propensity to form tar products, or constitutes the charge stock to a hydrogenation process to produce the starting materials for the alkylation and/or polymerization process, the utilization of the present inventive concept is advantageous in that the hydrogenation is selective to produce the desired monoolefins rather than result in complete saturation to paraffinic hydrocarbons.

OBJECTS AND EMBODIMENTS

The principal object of the present invention is to provide a novel hydrogenation catalyst. A corollary objective is to improve the selective hydrogenation of unsaturated hydrocarbons.

A specific object of the present invention is to effect the selective hydrogenation of butadiene to produce 1-butene and 2-butene.

These, as well as other objects, are achieved through the utilization of a hydrogenation catalytic composition of matter comprising a porous carrier material and a Group V-B metal hydride.

In a specific embodiment, our invention relates to a process which comprises reacting butadiene and hydrogen, at hydrogenation conditions, in contact with a Group V-B metal hydride and recovering butene from the reaction product effluent.

These, and other objects and embodiments, will become evident from the following, more detailed summary of our invention.

SUMMARY OF INVENTION

The novel catalyst of the present invention constitutes a Group V-B metal hydride. In referring to Group V-B metals, it is intended to allude to the *Periodic Table of the Elements*, E. H. Sargent and Company, 1964, to incude vanadium, niobium and tantalum. Since the metal hydrides exist in granular or powdered form, they may be utilized as such. However, a preferred form involves the utilization of a suitable porous, refractory inorganic oxide carrier material with which the Group V-B metal hydride is combined. The use of such carrier materials finds wide spread description in the prior art and, therefore, lengthy details thereof are not necessary herein. Suffice to say that suitable refractory inorganic oxides include alumina, silica, zirconia, hafnia, boria, mixtures thereof, etc. In general, with respect to effecting the hydrogenation reaction, it is desirable to avoid substantial cracking of the charge and product molecules into lower-boiling hydrocarbons. Therefore, a particularly preferred carrier material constitutes a substantially non-acidic alumina which may be attenuated through the co-joint use of alkali and alkaline-earth metal components. In some situations, however, it will be recognized that an acidic function is not only desirable, but leads to enhanced results. Thus, with respect to the selective hydrogenation of polynuclear aromatic hydrocarbons, the carrier material may contain up to about 25.0 percent by weight of silica so that the hydrogenated ring will be cracked to result in an alkyl-substituted mono-nuclear aromatic.

When utilizing the carrier material, it will contain the metal hydride in an amount of from about 5.0 percent to about 30.0 percent by weight. The catalytic composite is conveniently prepared by commingling the metal hydride and the finely-divided carrier material under reducing conditions and subjecting the mixture to a pilling or co-extrusion technique under a reducing gas atmosphere. Although the hydrogenation reaction can be effected in any suitable manner including a batch-type operation, the use of a fluidized-bed operation, a fixed-fluidized bed operation, the use of a fixed-bed, in which the reactants traverse the catalyst in downward flow is preferred. The hydrogenation reaction will be effected at a pressure in the range of about 100 psig. to about 3,000 psig., a liquid hourly space velocity of from about 0.2 to about 5.0 and an hydrogen concentration from about 2,000 standard cubic feet per barrel to about 20,000 standard cubic feet per barrel. The utilization of the metal hydride component affords relatively low maximum catalyst bed temperatures. Thus, the temperature of a reaction will be in the range of about 32° F. to about 400° F., and it is intended herein that the selected temperature refers to the maximum temperature of the catalyst within the reaction zone.

The reaction product effluent, for example, a mixture of butadiene, butenes, butanes, hydrogen and a minor amount of normally gaseous paraffins, may be separated in any suitable manner known to the prior art in order to recover the butenes. The unreacted butadiene is, of course, recycled to the hydrogenation reaction zone. Hydrogen and normally gaseous paraffins are readily removed by introducing the total reaction product effluent into a high-pressure separator at a temperature in the range of about 60° F. to about 100° F. The normally gaseous phase, rich in hydrogen, is at least in part recycled to the hydrogenation reaction zone, while the normally liquid product effluent is sent to suitable separation facilities for the recovery of the butene concentrate.

EXAMPLES

Powdered niobium hydride, in an amount of about 6.1 grams, and 27.0 grams of butadiene were charged to a 450 ml. rotating autoclave. The autoclave was pressured with hydrogen to a level of about 1,910 psig. (130 atmospheres), and heated to a temperature of about 80.6° F. (27° C.). After a period of 1 hour at the indicated temperature, the hydrogen pressure had decreased to a level of about 1,740 psig. (118 atmospheres). The autoclave was cooled and depressured, and the reaction mixture analyzed by gas-liquid chromatography. It was found that about 32.9 percent by weight of butadiene was converted, with about 28.2 percent of butenes, about 2.3 percent butane and 2.4 percent higher boiling materials being produced.

A catalyst is prepared by commingling spray-dried alumina particles and vanadium hydride under a $H_2$ gas blanket in an amount to result in a final composite containing about 20 percent by weight of the hydride. The mixture is pelleted into 1/16" × 1/16" substantially cylindrical pills, under a $H_2$ gas blanket and calcined to remove the lubricating agent employed during the pilling operation. The catalyst is disposed as a fixed-bed in a hydrogenation reaction zone, and hydrogen circulated therethrough at a rate of about 10,000 scf./bbl. until the pressure achieves a level of about 2,000 psig. Butadiene is introduced in admixture with the hydrogen at a temperature of about 80° F. and a liquid hourly space velocity (defined as volumes of butadiene per hour per volume of catalyst disposed within the reaction zone) of 1.0. The product effluent is separated to provide a hydrogen-rich recycle gaseous phase, a butadiene concentrate, for recycle to the hydrogenation reaction zone, and to recover a butene concentrate. Analyses indicate a conversion of butadiene of about 39.5 percent by weight and a selectivity of conversion to butene of about 95.0 percent.

The foregoing illustrates the method of effecting the present invention and the benefits to be afforded through the utilization thereof in the selective hydrogenation of unsaturated hydrocarbons.

We claim as our invention:

1. A process which comprises reacting butadiene and hydrogen, at hydrogenation conditions, including a temperature of from 32° F. to about 400° F. and a pressure in the range of 100 psig. to 3,000 psig, in contact with a Group V-B metal hydride and recovering butene from the reaction product effluent.

2. The process of claim 1 further characterized in that said metal hydride is vanadium hydride.

3. The process of claim 1 further characterized in that said metal hydride is niobium hydride.

4. The process of claim 1 further characterized in that said metal hydride is tantalum hydride.

5. The process of claim 1 further characterized in that said metal hydride is combined with a porous refractory oxide carrier material.

6. The process of claim 5 further characterized in that said carrier material is alumina.

7. The process of claim 5 further characterized in that said metal hydride is combined with said carrier material in an amount of from 5.0 percent to about 30.0 percent by weight.

8. A hydrogenation catalytic composition of matter comprising a porous carrier material and a Group V-B metal hydride.

9. The catalyst of claim 8 further characterized in that said carrier material is alumina containing 5.0 percent to about 30.0 percent of said metal hydride by weight.

* * * * *